Figure 1:
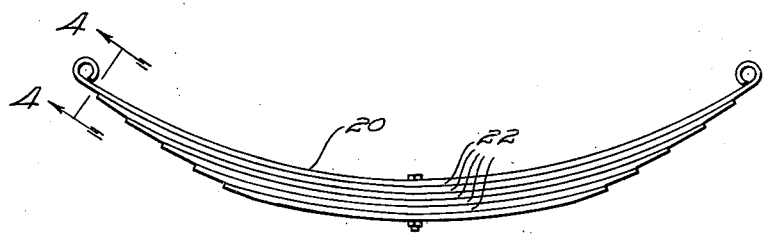

Jan. 7, 1936.  W. H. WALLACE  2,026,599

LEAF SPRING

Filed Sept. 4, 1931

INVENTOR
William H. Wallace.
BY
Harness, Dickey, Pierce & Hann,
ATTORNEYS.

Patented Jan. 7, 1936

2,026,599

UNITED STATES PATENT OFFICE 2,026,599

LEAF SPRING

William H. Wallace, Detroit, Mich.

Application September 4, 1931, Serial No. 561,186

2 Claims. (Cl. 267—47)

My invention relates to multiple leaf springs and has particular relation to leaf springs particularly adaptable for automotive vehicles.

The invention has for its main objects the provision of leaves of such cross section, that in comparison with leaves of conventional cross section, with the same stress in the tensional fibres, they have greater strength and less weight, or with the same stress in the tension fibres, they have the same strength and appreciably less weight, or with less stress in the tension fibres, they have the same strength and less weight. These and other objects will be apparent from the perusal of the accompanying specifications and consideration of the drawing to which it relates.

Figure 2:
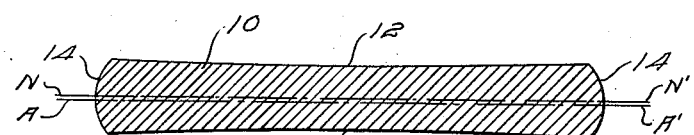
Figure 3:
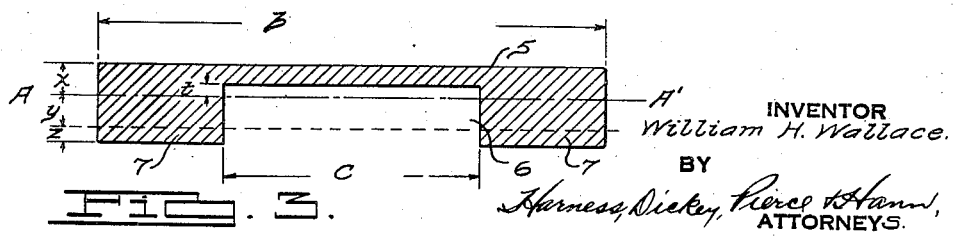

In the drawing, Fig. 1 is a side elevation of a spring assembly of the type employed for supporting a vehicle. Fig. 2 is a cross sectional view of a conventional leaf structure. Fig. 3 is a cross sectional view of a rectangular section with changes to make it a channel section.

Figure 4:
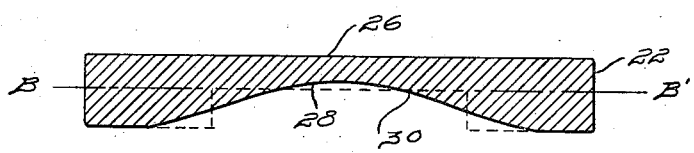

Fig. 4 is a cross sectional view taken substantially upon the line 4—4 of Fig. 1 and disclosing a spring leaf embodying the principles of my invention.

The construction in the present invention is an improvement on that described in my prior Patent 1,730,700, granted October 8, 1929.

In the conventional type of vehicle springs, the various leaves, such as leaf No. 10 disclosed in Fig. 2, have upper and lower faces, both of which are transversely slightly concave, as indicated at 12.

Tables for specifying the amount of concavity are disclosed in 1931 edition of the S. A. E. Handbook, page 425.

It will also be observed that spring leaves of conventional design, as disclosed in Fig. 2 are provided with round edges with a radius of two-thirds of their thickness, as specified by the 1931 edition of the S. A. E. Handbook, thereby providing the leaf with maximum width at or near the neutral axis of the leaf. In the conventional structure this neutral axis is disposed midway between the upper and lower faces of the leaves, thus dividing the leaf cross sectionally with symmetrical halves.

It is observed that when leaves of this type are severely flexed, the neutral axis is displaced downwardly with respect to the upper and lower faces of the spring leaf from the position N—N' to the position A—A'. Because of the fact that the steel composing the leaves will rupture from tensional forces sooner than compression forces, it is apparent that the leaves, even before displacement of the neutral axis, will stand more stress on the compression side than on the side of the leaf in tension, and the displacement of the axis only increases the tendency of the steel to rupture as the stress on the tension side is increased and the stress on the compression side decreased. Therefore, leaves of the conventional cross section are broken by stresses in the fibres on the tension side of the neutral axis.

In accordance with the provisions of my invention, the various defects encountered in connection with springs made of leaves with conventional cross section are overcome or at least materially mitigated, by providing leaves, the transverse neutral axis or centers of gravity of which are materially farther spaced from the compression side of the leaves than from the tension side, and on which a considerable portion of the relatively useless metal immediately adjacent to the neutral axis is eliminated.

In my construction, the neutral axis of the leaf is nearer the tension side of the leaf, hence the tendency to rupture from tension is lessened and allowance is made for the distance the neutral axis will be lowered by flexure, so that as the leaf is flexed it has no more tendency to fail from tension than from compression.

Spring leaves of the conventional cross section are made as shown in Fig. 2 with the upper and lower faces transversely concave as indicated at 12 and with rounded edges 14.

The moment of inertia of a cross section, about the neutral axis N—N', hereinafter designated by I, is the measure of the strength of a beam, and for beams of rectangular cross section of $b$ width and $h$ thickness, $$I \text{ equals } \frac{bh^3}{12}$$

and to show the relative values of the upper and lower sections, this may be written $$I \text{ equals } \frac{b\left(\frac{h}{2}\right)^3}{3} + \frac{b\left(\frac{h}{2}\right)^3}{3} = \frac{bh^3}{12}$$

and the transverse neutral axis passes through the geometric center.

Since the stress in the fibres are directly proportional to their distance from the neutral axis, the stress in the most remote upper fibres equals the stress in the most remote lower fibres, and if, as it will hereinafter be understood, the beam or leaf is supported between its ends and loaded with downward forces at its ends, the upper fibres will be in tension and the lower fibres in compression.

Referring again to Fig. 2 if a portion of the cross section be removed and the area of this section be designated by A and the I of the new cross section be Ia and the original cross section by Ib, then Ia equals Ib minus the I of the portion removed with relation to its own neutral axis, minus A times the square of the distance from A to the neutral axis.

Hence material adjacent to the neutral axis may be removed and decrease I comparatively little, and the more remote from the neutral axis, the more the material removed will decrease I. Hence, the material removed from a rectangular section to form the concave surface of conventional spring leaves is the most effective in decreasing I, as are also the rounded edges, so that a slight decrease in weight is accompanied by a comparatively large decrease in I, and a true rectangular cross section is more economical in disposition of material than the conventional cross section used.

An ideal cross sectional form for a spring leaf embodying my invention is shown in Fig. 3 and will be used for demonstrating the theory underlying the invention. In this form a leaf 5 of rectangular cross sectional contour has a rectangular portion 6 extending through the compression zone across the neutral axis A—A' and into the tension fibres adjacent to the axis removed. An amount of metal 7 is added on each side of the channels formed by removal of the metal 6, thus compensating for the slight reduction of moment of inertia which otherwise would accompany the removal of the metal to provide the channel. By such construction some of the metal near the neutral axis where it is of relatively slight value for resisting flexure of the spring is removed and the metal which is replaced is much more effective than in its original position.

I will now proceed to prove that the cross section I propose is more economical than a true rectangular cross section, hence more economical than the conventional cross section.

Let $b$=width
$x+y$=depth
$c$=width of section cut out on compression side
$z$=depth of section added on compression side
$f$=working stress
$t$=depth of section removed on tension side The moments on one side of the neutral axis must equal the moments on the other side.

For the rectangle
$M = \frac{1}{6} f b x^2 = \frac{1}{6} f b y^2$
$x=y$ and the neutral axis is in the geometric center Since $f$ for tension and compression is the same, it will be omitted in future repetition of this formulae.

If a section of C width and $y$ depth be removed then the moment of the section removed equals $$\frac{cy^2}{6}$$

If the neutral axis is to remain unmoved, an equal moment must be taken from the upper section or the lower section increased in depth.

Let $z$ equal necessary increase in depth.
Then
$$\frac{z(b-c)(y+z)}{6} = \frac{cy \cdot y}{6}$$

Since $z$ is positive $y+z$ must be greater than $y$, hence $z(b-c)$ must be smaller than $cy$ so that the weight of the section added, $z(b-c)$, is less than the section removed, $cy$.

Since
$$\frac{(y+z)^2(b-c)}{6} = \frac{y^2 b}{6}$$

and the I of a section is proportional to its moment multiplied by depth, and $y+z$ is greater than $y$
$$\frac{(y+z)(y+z)^2(b-c)}{6}$$

must be greater than
$$\frac{y \cdot y^2 b}{6}$$

and the I of the section whose area is $(y+z)(b-c)$ greater than I of the section $b\,y$, so that by removing the section $c\,y$ and adding $z(b-c)$ we have a cross section of less weight and greater strength and with no more stress on the tension surface.

Now extend the depth of channel so that it exceeds $y$ and crosses the neutral axis a distance of $t$ and decreasing the distance $z$ so that the neutral axis remains unchanged when the I of the section, considered as a whole, equals the I of the original rectangle. It is obvious that since the moment of the area $t\,c$ is small, its area must be comparatively large with respect to the area $z(b-c)$ and the section has been made considerably lighter, so that in comparison with a rectangle we have a cross section of the same strength, of appreciably less weight and with no more stress on the tension surface.

If, instead of increasing the depth of the channel beyond the neutral axis of the rectangle, it is desired to reduce the values of $x$ and $y+z$ so that the I of the channel section equals the I of the original rectangle, $x$ decreases and the surface in tension is less remote from the neutral axis, hence in less stress, so that we have a cross section which, in comparison with the original rectangle, is of the same strength, less weight and with less stress on the surface in tension.

During the processes of shaping and heat treating a spring leaf, a thin surface layer of a material having very little tensile strength is formed. If this surface layer of material is removed from the surfaces subject to tension, the actual allowable fibre stress of the surface fibres is much closer to the theoretically allowable fibre stress and appreciably greater than when said surface layer of material is retained; so that the efficiency of my proposed cross section can be enhanced by polishing or otherwise removing the said surface layer of material from the surfaces subject to tension.

In practice, the sides of the channel are preferably rounded, as shown in Fig. 4 and care is exercised so that sufficient material is left at the neutral axis to prevent the leaves failing from shearing stress, and to see that the stresses on the compression surfaces are not increased so as to become excessive, but shall be so proportioned that the total maximum tension to which the portion of the leaf above the neutral axis is capable of resisting, is approximately equal to the total maximum compression which the portion of the metal below the neutral axis is capable of withstanding without permanent distortion.

In a practical application of the invention a spring assembly indicated generally by the numeral 20 is formed by a series of superposed leaves 22 of graduated length in conventional manner. The main feature of the invention comprises the use of leaves having their respective neutral axis disposed closer to the face in which the material is under tension than to the face in which the material is under compression. The cross sectional contour of a practical form of leaf embodying my invention is shown in Fig. 4. This leaf embodies upper or tension face and a relatively deeply concave lower or compression face 30. In actual practice the channel in the spring cannot conveniently be rectangular but as shown formed with rounded sides.

In my improved construction the neutral axis B—B' will be located appreciably nearer the extreme outer tension material of the spring than to the extreme outer compression fibers. In fact as shown in the drawing, the concavity on the compression side may, as indicated at 28, extend inwardly beyond the neutral axis into the tension zone. A material quantity of metal adjacent to the neutral axis which would not materially increase the resistance of the spring to flexure is thus eliminated. The resistance to flexure is maintained or may even exceed that of a conventional leaf of similar width even though the weight of the leaf is less than that of the latter.

I claim:

1. A spring leaf having a cross-section the tension side of which is substantially flat and the compression side of which has a concavity which is formed by a longitudinal groove the sides of which are divergent toward the compression side of the leaf and which is symmetrically positioned with respect to the edges of the leaf, the portions of said compression side that are adjacent to the edges of the leaf being substantially flat and parallel with said tension side, the central portion of said concavity extending across the neutral axis and into the tension area of the section, and the compression portion of the cross-section of the leaf being of such area and so arranged in relation to the neutral axis that, for a given working deflection of the leaf, the total stress to which the fibers on the tension side of the neutral axis are subjected shall be maintained substantially at a minimum to support the load producing the deflection and bear substantially the same relation to the tensile strength of the cross-sectional area in tension, that the total stress in the fibers on the compression side of the neutral axis bears to the strength in compression of the cross-sectional area that is in compression, and the tension fibers and compression fibers most remote from the neutral axis will not be stressed to their elastic limits in tension and compression respectively.

2. A spring leaf having a cross-section the tension side of which is substantially flat and the compression side of which has a concavity which is formed by a longitudinal groove the sides of which are divergent toward the compression side of the leaf and which is symmetrically positioned with respect to the edges of the leaf, the portions of said compression side that are adjacent to the edges of the leaf being substantially flat and parallel with said tension side, the central portion of said concavity extending at least to a depth equal to one-half of the edge thickness of the section, and the compression portion of the cross-section of the leaf being of such area and so arranged in relation to the neutral axis that, for a given working deflection of the leaf, the total stress to which the fibers on the tension side of the neutral axis are subjected shall be maintained substantially at a minimum to support the load producing the deflection and bear substantially the same relation to the tensile strength of the cross-sectional area in tension, that the total stress in the fibers on the compression side of the neutral axis bears to the strength in compression of the cross-sectional area that is in compression, and the tension fibers and compression fibers most remote from the neutral axis will not be stressed to their elastic limits in tension and compression respectively.

WILLIAM H. WALLACE.